(No Model.) 2 Sheets—Sheet 1.
A. C. & J. D. TOWER.
CULTIVATOR.
No. 295,080. Patented Mar. 11, 1884.
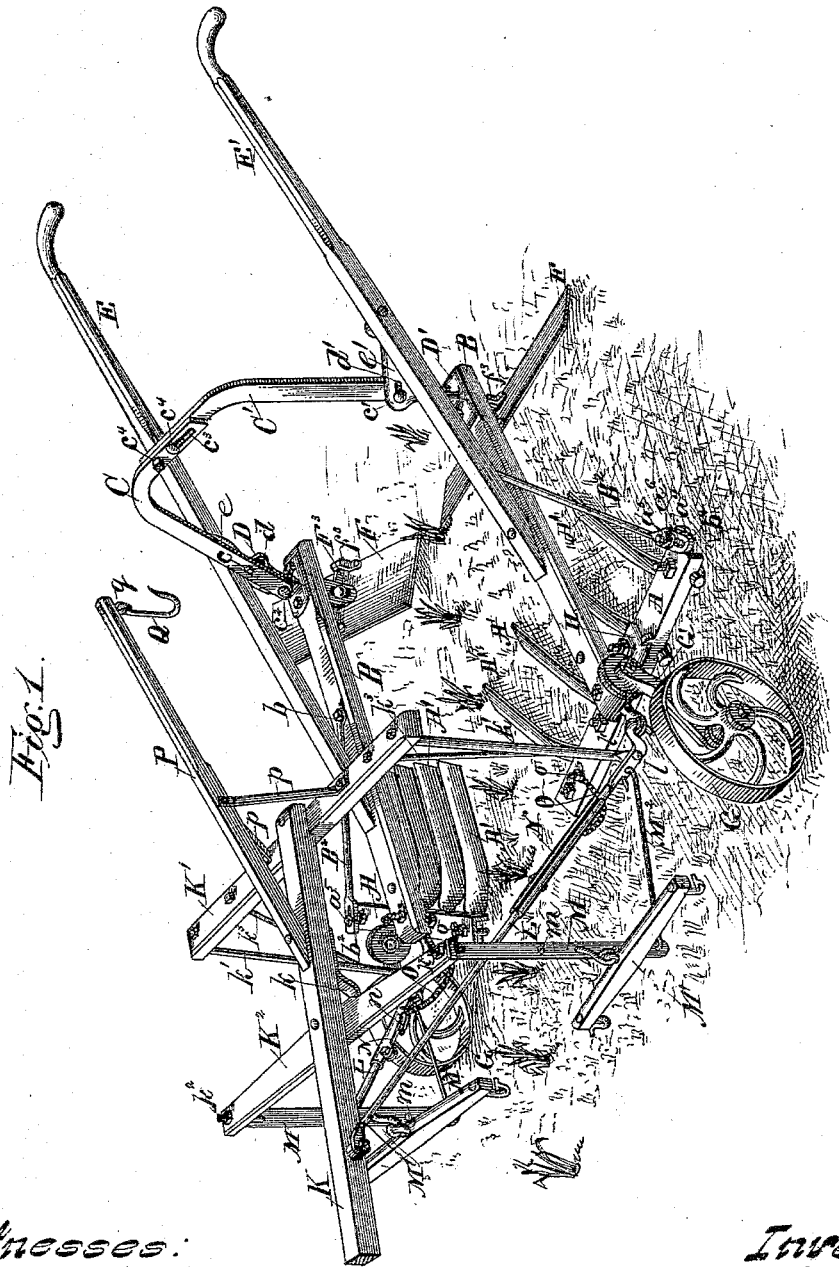

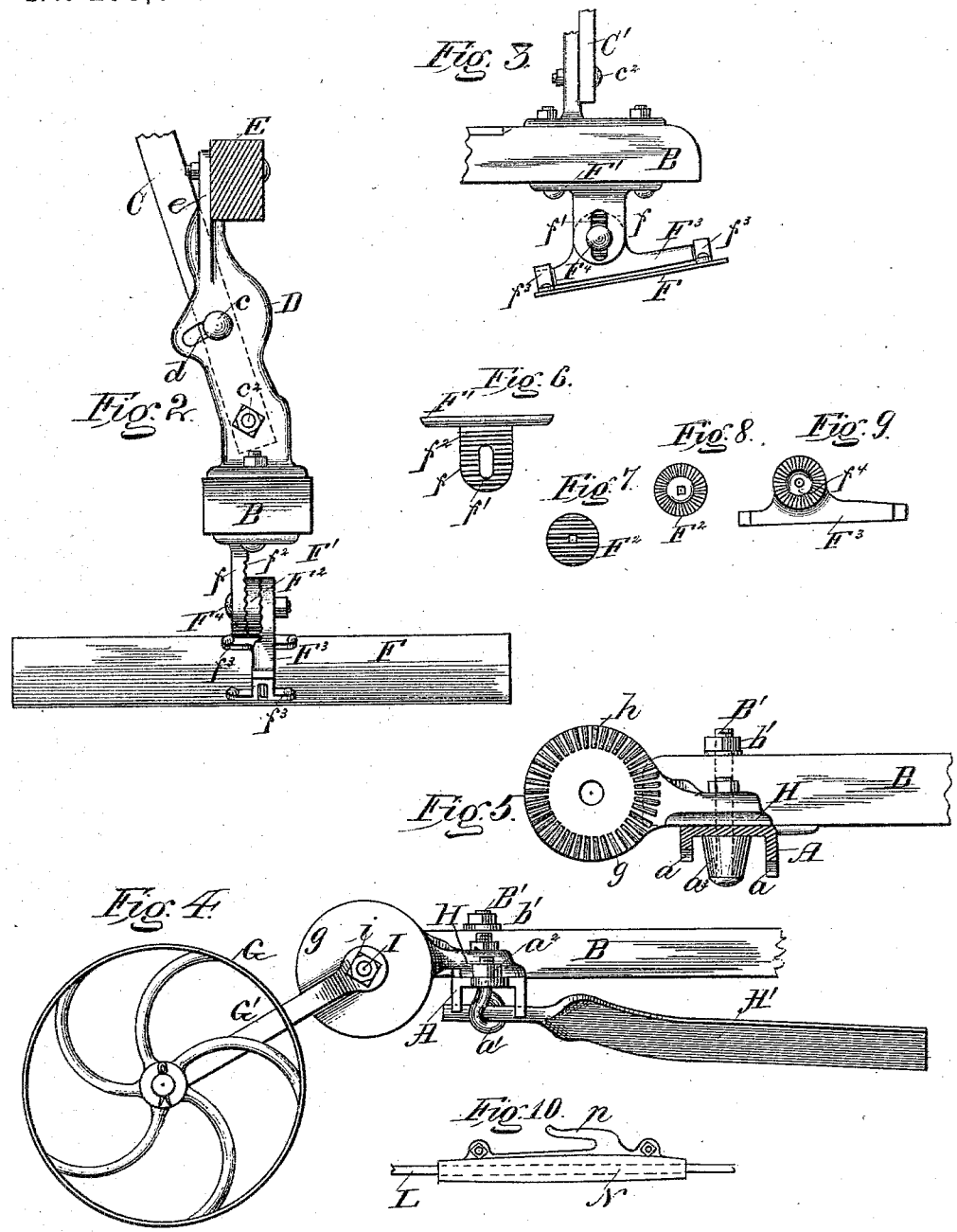

UNITED STATES PATENT OFFICE.

AUGUSTUS C. TOWER AND JUSTUS D. TOWER, OF MENDOTA, ILLINOIS.

CULTIVATOR.

SPECIFICATION forming part of Letters Patent No. 295,080, dated March 11, 1884.

Application filed June 13, 1883. (No model.)

*To all whom it may concern:*

Be it known that we, AUGUSTUS C. TOWER and JUSTUS D. TOWER, of Mendota, in the county of La Salle, and in the State of Illinois, have invented certain new and useful Improvements in Cultivators; and we do hereby declare that the following is a full, clear, and exact description thereof.

Our invention relates, especially, to devices used in cultivating corn, &c., and is adapted to pulverize the ground close up to the hill without disturbing the roots, and is in part an improvement on the cultivator patented to Augustus C. Tower on January 14, 1873, and July 7, 1874; and it consists in certain peculiarities of construction, as will be more fully set forth hereinafter.

In the drawings, Figure 1 is a perspective view of our entire device, and Figs. 2 to 10, inclusive, are details of portions thereof.

The present device, like those on which it is an improvement, consists, primarily, of two front beams carrying teeth or knives and connected to an adjustable draft device, and having other beams extending backward from the tooth-beams, which backward-extending beams have near their rear ends clod-crushing plates attached thereto; but the construction and manner of attaching and adjusting the various parts in the present invention are essentially different and novel.

A A represent the front or tooth beams. These in the present device are made of iron, of double-angle shape in cross-section, open at the bottom, and provided with the notches $a$ in the front, and rear flanges to receive the teeth A', the said front flanges being of less depth than the rear flanges, in order to give the teeth a downward rear projection, as shown. The tops of these metal beams are perforated in transverse line with the notches $a$, to receive the shanks of the ring-bolts $a'$, through the eyes of which the shanks of the teeth A' extend, and these ring-bolt shanks are screw-threaded, so that when the teeth have been adjusted to place they may be securely fastened by the nuts $a^2$, all as shown in Fig. 4. The shanks of the teeth A' are round, and hence the blades may be set at any angle to a vertical line desired, and the cutting-edges of the teeth in each beam are adjusted toward a common center from the right and left, respectively, as shown in Fig. 1.

B B are the longitudinal beams, and their front ends are pivoted to the beams A. These latter beams have on their under sides, midway of their length, the hubs or circular flanges $a^3$, and a bolt, B', passes up through a hole in each flange or hub $a^3$, and through a corresponding hole in the beam B above, and is secured by a nut, $b'$, as shown best in Fig. 5. The beams B are pivoted to the beams A at an angle other than a right angle, and when adjusted to the desired angle they are rigidly secured in such position, as follows: At the outer end of each tooth-beam A is a short horizontal flange, $a^4$, which is perforated to receive a bolt, $a^5$, which passes up through said perforation, and then through a slot or eye, $b^2$, at the end of a brace or rod, B$^2$, whose other end is secured rigidly at $b$ to the beam B, and when the beams A and B are in their desired relative positions a washer is placed on the bolt $a^5$ over the slotted eye $b^2$, and on this a nut, $a^6$, is screwed down, making the said beams rigid at the angle preferred.

The rear projecting beams, B B, are connected in this machine by a rear bow, as in the previous patents referred to; but its construction and method of adjustment are wholly different. Instead of being a solid continuous bow, or one made adjustable by slots in the beams from which it rises, it is made in two parts, C and C', and is adjustable at three points—namely, at the top, and also on the handle-braces, to be next described. These braces D and D' rise from near the rear ends of the beams B B, to which they are rigidly bolted, and have arms $e$ and $e'$, respectively—one nearly vertical and the other nearly horizontal—and the handles E and E', which rise from the beams B B, to the center of which their front ends are bolted, are also bolted to the arms $e$ and $e'$ of these braces, the said handles projecting to the left of the longitudinal line of the machine, so that the operator will walk in the furrow between the hills of corn, &c., being cultivated. These braces D and D' are further provided with the diagonal or downward and inward inclined slots $d$ and $d'$, and below these with holes for the pivot-bolts $c^2 c^2$ of the two arms C and C' of the bow, while $c$ and $c'$ are other bolts which pass through the diagonal slots $d$ and $d'$ and secure the said arms to the said braces after adjustment. The upper curved end of each arm of the bow is provided with a slot, $c^3$, and just back of that with a round hole, through which a bolt, $c^4$, passes, and then passes through the slot in the overlapping arm of the bow; and the said bolts are all furnished with nuts, so that the whole can be made rigid when the bow has been adjusted at the three points described, and hence the beams B B can be at any time set at any distance apart desired within the limits of the device. This is an important feature, as the machine is intended to cultivate on each side of a row of hills of corn or other vegetables, and hence must be made adjustable to adapt it to a field which may have the rows of corn, &c., at different widths apart from those in the field last cultivated, and yet to be capable in all instances of pulverizing the ground close up to the said hills.

F F are the clod-crushing plates, which are suspended from the under side of the rear portions of the beams B B, and made movable, instead of rigid, as heretofore. F' are the plates or hangers bolted to the said beams B, and having vertical slots $f'$ in their vertical arms $f$. The inner sides of these arms are provided with horizontal ridges or corrugations $f^2$, Fig. 6, and receive the similar ridges on the adjacent side of the corrugated washer $F^2$, Fig. 7, whose other side is provided with a central depression and an outer ring of radial corrugations, Fig. 8. The plates F are each provided with two loops or brackets, $f^3$, which receive the ends of a hanger, $F^3$, which is provided with a flange having a hub, $f^4$, projecting outward at the center to fit within the central depression in the washer $F^2$, while around this is a ring of radial corrugations, all as shown in Fig. 9, to fit against the similar ring on the washer when all the parts are put together and fastened by the bolt $F^4$ and its nut. By means of the slot $f'$ and the horizontal corrugations $f^2$ on the arm $f$ and washer $F^2$ the elevation of the plates F can be regulated, while their desired angle of inclination can be secured by means of the radial corrugations on the other side of the washer $F^2$, and those around the hub $f^4$ on the hanger $F^3$. The ends of the hanger $F^3$ are considerably smaller than the loops of the brackets $f^3$, in which they are secured, and hence the plates F have considerable play or oscillation as the machine is drawn over the ground, and the clods are thus effectually broken up.

G G are the wheels which support the device, and these are adjustably secured to plates on the beams A in such a manner that the depth to which the knives or teeth A' will penetrate the ground may be adjusted or varied at will. G' is the bent axle of one of these wheels, which is secured thereto at one end, while the other end of the axle terminates in the solid disk $g$, the inner face of which is provided with a ring of radial corrugations, and H is a flanged plate secured on top of the beam A, (by the elongated shank of one of the tooth-eyebolts,) and whose flange likewise ends in a solid disk, $h$, similarly provided with a ring of radial corrugations, as shown in Fig. 5, and when the two corrugated faces of the disks $g$ and $h$ are put together they are readily secured by the bolt I, passing through the holes in the said disks and its nut $i$. Hence it will be seen that as the wheels G and the points of the knives or teeth A' rest on the ground, (the axles G' and the knives or teeth forming an arch or triangle of which the beam A will be the apex,) the said teeth can be caused to penetrate more deeply into the ground by making the said angle more acute; or, vice versa, by making the angle more obtuse the teeth will pulverize the soil to a less depth.

The draft device will be next described.

K is the tongue, and K' the rear cross-bar, bolted thereto, and $K^2$ is an evener pivoted between the under side of the tongue and a strap of iron, $k$. From each side of the tongue, a little forward of the evener, there extend diagonally downward the braces or rods L L, which terminate in hooks $l\, l$, adapted to enter eyebolts $l'$, secured to the front of the beams B, whereby the draft device is detachably secured to the cultivator proper, and $k'\, k'$ are vertical braces extending from the ends of the cross-bar K' to near the rear ends of the braces L L, just forward of the hooks $l l$, and securely bolted to place, (being further strengthened, if desired, by diagonal braces $k^3$, as shown,) while at each end of the evener $K^2$ are eyebolts $k^2$, from which are suspended flat rods or metal straps M M, provided with perforations $m$, so as to adjustably hang the whiffletrees M' therefrom at whatever elevation is desired, and from a hole near the bottom of each of these straps M there extends a rod, $M^2$, the rear hooked ends of which are secured in holes in the braces L, just forward of the points of attachment of the vertical braces $k'$. On each of the diagonal braces L is a clamping device, N, composed of two plates secured together by bolts and nuts, as shown, and clasping the brace L between them, which clamping device is further furnished with a hook, $n$, to receive one end of a chain, O, the other end of which is secured by a bolt, $o$, to near the inner end of the tooth-beam A on each side. The tooth-beams are thus held at any desired angle to the line of draft, while their diagonal position is further insured by means of the braces $B^2$, already described.

In turning the corner at the end of a furrow, or in conveying the machine over the road or to the field to be cultivated, it is desirable that the teeth should not tear up the ground, and to insure this a beam, P, is secured to the top of the tongue, between the evener and rear cross-bar, and this beam is beveled off at its forward end, so that it may project up and back at an angle, as shown. It is braced on each side by braces $p$ $p$, extending from the middle of said beam to the cross-bar, and bolted to each, and at its rear end it bears an eyebolt, $q$, from which is suspended a hook, Q. Whenever it is desired that the teeth A' shall not operate, the cultivator is raised upon the wheels G G until the hook Q receives the bow C C', and in this position the team may be driven to any place desired without detachment of any of the parts, and with the certainty that the teeth shall not tear up the ground.

Having thus described our invention, what we claim as new, and desire to secure by Letters Patent, is—

1. In a cultivator, the combination, with the frame, of the clod-crushing plates F, loosely suspended from the rear part of the machine by adjustable bearings, whereby the vertical elevation and inclination of the said plates may be regulated at will, substantially as set forth.

2. In a cultivator having two tooth-beams adapted to operate on each side of a row of corn, &c., backward-extending beams bearing clod-crushing plates at their rear ends, in combination with the rear bow connecting said beams, and formed in two parts, C and C', adjustably united at top to regulate the distance apart of the rear end of the machine, substantially as set forth.

3. In a cultivator, the combination of the tooth-beams A with the backward-extending beams B, pivoted thereto, and the rods $B^2$, connecting the beams A and B, and having slots $b^2$ at their forward ends, whereby the said beams may be adjusted at the angle desired with respect to each other and secured in such position, substantially as set forth.

4. The plate F', having vertical arm $f$, with slot $f'$, and inner horizontal ridges, $f^2$, washer $F^2$, with horizontal ridges on one side and radial ridges on the other, and hanger $F^3$, with flange having inner radial ridges, in combination with the plate F, having loops or brackets $f^3$, substantially as set forth.

5. In combination with the rear beams and handles of a cultivator, the braces D and D', having diagonal slots $d$ and $d'$ and arms $e$ and $e'$, and the connecting-bow consisting of two arms, C and C', perforated and slotted at their upper overlapping ends, and pivoted at their lower ends to the said braces, and adapted to be adjustably secured by the bolts $c$, $c'$, and $c^4$, substantially as set forth.

6. The metallic tooth-beams A, formed of double-angle iron, the front vertical flange of which is of less depth than the rear vertical flange, and each provided with the notches $a$ on the under side, in transverse line with each other, and with perforations in the top flange, in combination with the teeth or knives A', having curved cutting-blades and round shanks, and the eyebolts $a'$ and nuts $a^2$, whereby the said teeth or knives may be secured with their blades at any inclination from a vertical line desired, and with their rear ends projecting downward, substantially as set forth.

7. In combination with the front beams of a cultivator having the eyebolts $l'$ $l'$, the tongue K, rear cross-bar, K', with vertical braces $k'$, diagonal braces L L, bolted to the tongue and to the vertical braces $k'$, and ending in hooks $l$ $l$, for engagement with the said eyebolts $l'$ $l'$, evener $K^2$, having metal straps M, suspended therefrom, and rods $M^2$, connecting the lower ends of the said straps with the diagonal braces L, substantially as set forth.

8. In combination with the diagonal braces L, the clamping-plates N, adjustably secured thereto, and having hooks $n$, integral with said plates, whereby the closed links at the ends of the chains may be readily attached thereto or detached therefrom, substantially as set forth.

In testimony that we claim the foregoing we have hereunto set our hands, on this 31st day of May, 1883, in the presence of two witnesses.

AUGUSTUS C. TOWER.
JUSTUS D. TOWER.

Witnesses:
CASPAR FISCHER,
W. W. BARRETT.